United States Patent [19]

Seo

[11] Patent Number: 5,203,871
[45] Date of Patent: Apr. 20, 1993

[54] TRIPOD WITH HORIZONTAL AND VERTICAL SENSING MEANS FOR A CAMCORDER

[75] Inventor: Yoon T. Seo, Seoul, Rep. of Korea

[73] Assignee: Goldstar Co., Ltd., Seoul, Rep. of Korea

[21] Appl. No.: 802,662

[22] Filed: Dec. 5, 1991

[30] Foreign Application Priority Data

Dec. 7, 1990 [KR] Rep. of Korea .................. 90-19281

[51] Int. Cl.⁵ ...................... G03B 17/56; F16M 13/00
[52] U.S. Cl. ...................................... 248/542; 248/169
[58] Field of Search ............... 248/170, 171, 542, 169, 248/168; 354/293, 126; 358/229

[56] References Cited

U.S. PATENT DOCUMENTS

| 4,199,123 | 4/1980 | Weber et al. ...................... 248/542 |
| 4,366,940 | 1/1983 | Vargas ................................. 248/542 |
| 4,648,697 | 3/1987 | Kawazol ........................... 248/171 X |

FOREIGN PATENT DOCUMENTS 289091  2/1958  Switzerland ..................... 248/542

Primary Examiner—Alvin C. Chin-Shue
Attorney, Agent, or Firm—Morgan & Finnegan

[57] ABSTRACT

Disclosed is a tripod for a camcorder which comprises a head part with an adjustment handle for holding the camcorder, a horizontal sensing means mounted on one side of the head part for sensing the horizontal position of the camcorder, a leg part for supporting the head part, and a vertical sensing means mounted on a head fixing central shaft extended from the bottom of the head part for sensing the vertical position of the camcorder.

3 Claims, 2 Drawing Sheets

TRIPOD WITH HORIZONTAL AND VERTICAL SENSING MEANS FOR A CAMCORDER

FIELD OF THE INVENTION

The present invention concerns a tripod for supporting a camera or camcorder, and more particularly a tripod with horizontal and vertical levels for easily adjusting the horizontal and vertical positions of the camcorder when positioning the tripod.

BACKGROUND OF THE INVENTION

A conventional tripod for a camcorder is constructed as shown in FIG. 1, where a head part 102 with an adjustment handle 103 is mounted on the upper end of the tripod. The leg part 104 has an adjustment fixing member 105. The camcorder 101 is mounted on the head part 102.

Although the leg part 104 is foldable, the horizontal and vertical positions of the tripod may be partly adjusted only by the adjustment handle 103 attached to the head part 102.

The leg part 104 can be expanded or contracted in triangular directions and be fixed by the adjustment fixing member 105 when moved upwardly and downwardly so as to stably adjust the vertical position of the head part 102. Also the adjustment handle 103 is used to adjust the left/right or high/low position of the head and the setting position of the camcorder 101.

In such a conventional tripod, there is not provided a sensing means for showing whether the tripod is in horizontal and vertical position or balanced particularly when placed on an inclined or uneven surface, thus resulting in an undesirably processed image.

SUMMARY OF THE INVENTION

It is an object of the present invention to provide a tripod for a camcorder with horizontal and vertical levels that helps the camcorder take pictures stably in horizontal and vertical position.

It is another object of the present invention to provide a tripod for a camera and the like for precisely sensing the horizontal and vertical positions of the camera.

According to the present invention, a tripod for a camcorder comprises a head part with an adjustment handle for holding the camcorder, a horizontal sensing means mounted on one side of the head part for sensing the horizontal position of the camcorder, a leg part for supporting the head part, and a vertical sensing means mounted on a head fixing central shaft extended from the bottom of the head part for sensing the vertical position of the camcorder.

The present invention will now be described more specifically with reference to the drawings attached only by way of example.

BRIEF DESCRIPTION OF THE ATTACHED DRAWINGS

DETAILED DESCRIPTION OF A CERTAIN PREFERRED EMBODIMENT

Figure 1:
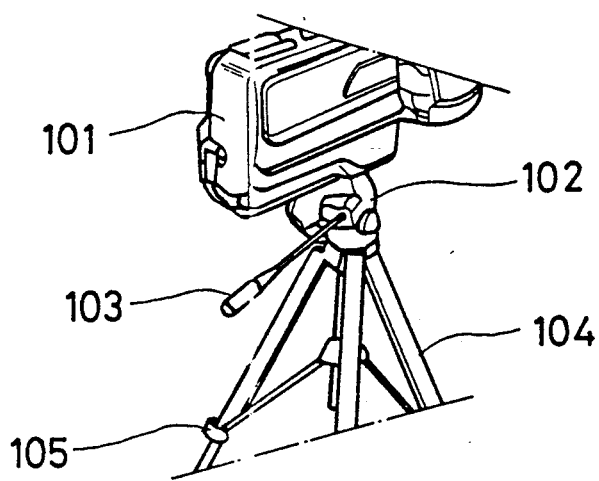
FIG. 1 is a perspective view of a conventional tripod.
Figure 2:
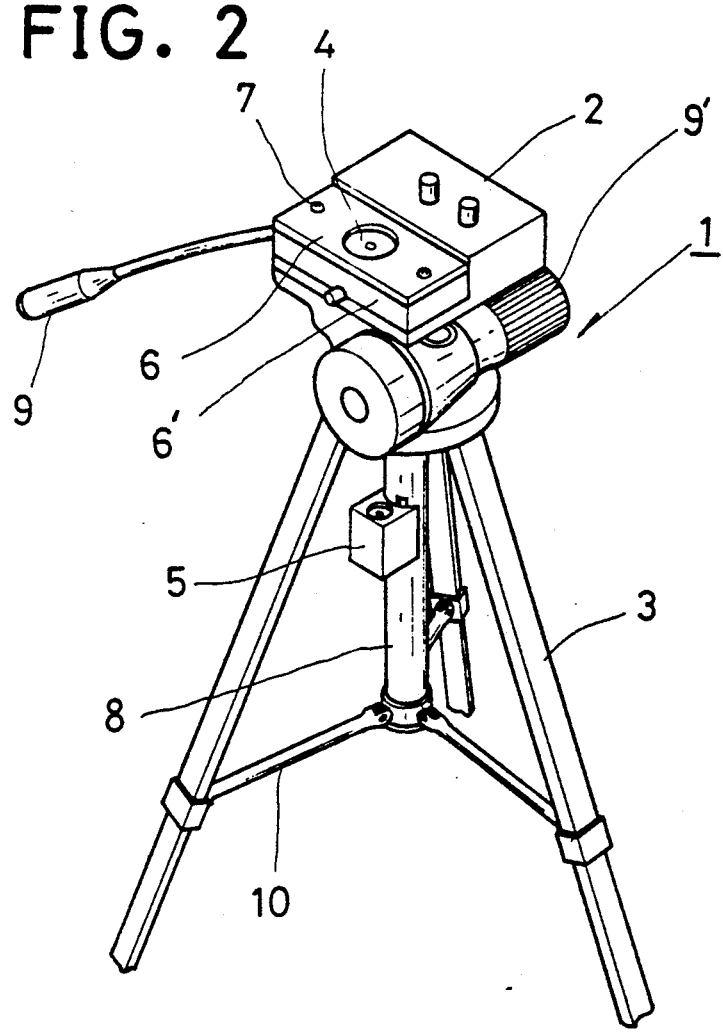
FIG. 2 is an overall perspective view of a tripod according to the present invention.
Figure 3:
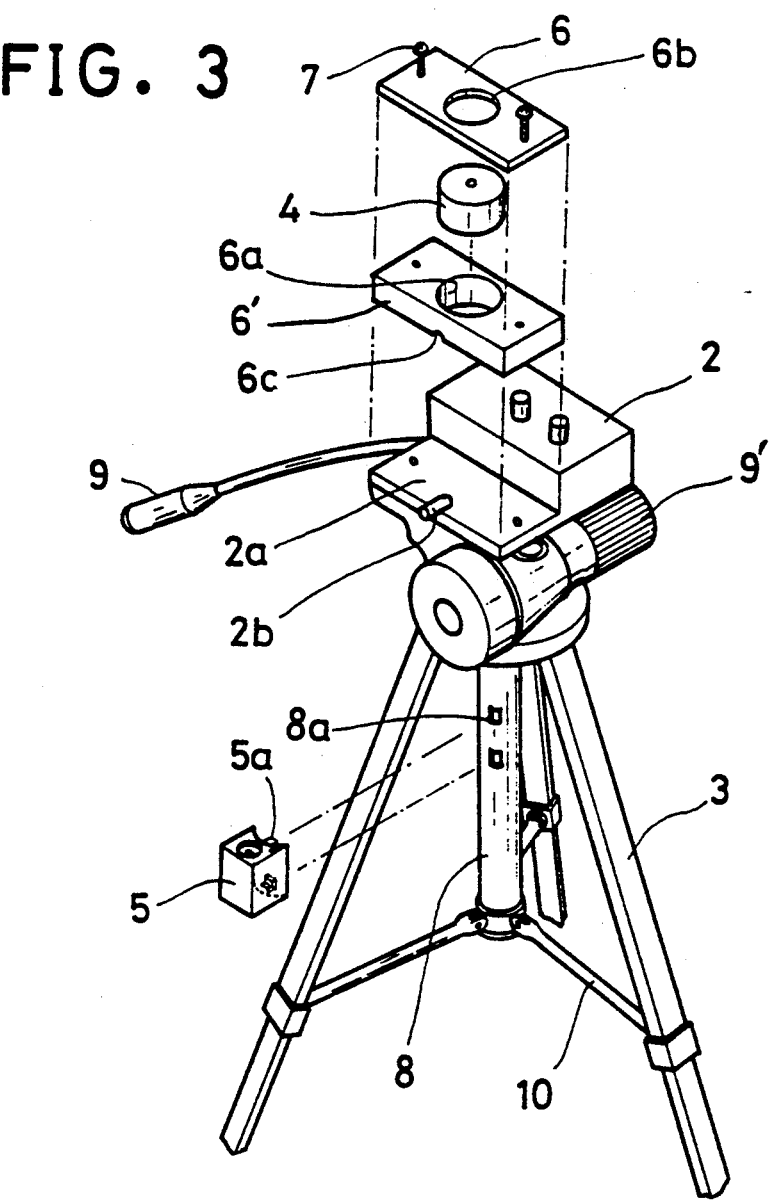
FIG. 3 is an exploded view of the tripod shown in FIG. 2.
Figure 4:
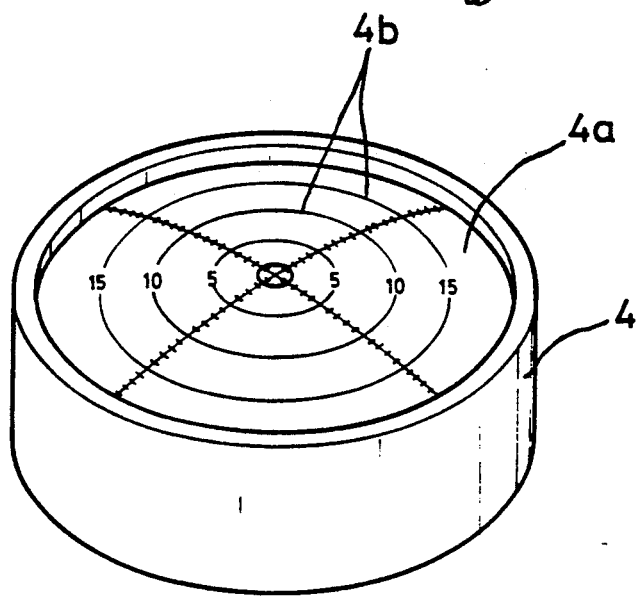
FIG. 4 is an embodiment of a level used in a tripod according to the present invention.

Referring to FIGS. 2 and 3, there is shown a tripod with a head part 2 on the upper end. A head fixing central shaft 8 is integrally extended from the central portion of the bottom of the head part 2. Along the head fixing central shaft 8 is mounted an adjustment fixing member 10 to guide and adjust the spreading angle of a leg part 3. There are also provided horizontal and vertical levels 4 and 5 that may be the kind of level for establishing a horizontal line or plane by means of a bubble in a liquid that shows adjustment to the horizontal by movement to the center of a glass tube.

The horizontal and vertical levels 4 and 5 are mounted as shown in FIG. 3. Namely, the horizontal level 4 is fixedly interposed between an upper housing 6 and lower housing 6', which housings are fixed in a housing mounting portion 2a formed in one side of the head 2 by screws 7. The lower housing 6' has an opening 6a whose diameter has the size to sufficiently receive the horizontal level 4. The upper housing 6 mounted on the lower housing 6' has also an opening 6b whose diameter has the size to sufficiently allow the observance of the level but to prevent the level from escaping upwardly.

Of course, the upper and lower housings 6 and 6' may be integrally formed as a single housing body with an internal cavity for receiving the level, or otherwise the level may be integrally formed with the head part 2 of the tripod, but it is more preferable that they are separately prepared so as to replace or repair a damaged level.

Formed on the bottom of the lower housing 6' is a locking groove 6c engaged with a position fixing projection 2b formed in the head part 2, which also facilitates the precise positioning of the lower housing 6' and the head part 2.

Meanwhile, the vertical level 5 is mounted on a selected position along the head fixing central shaft 8 integrally extended from the head part 2 that is mounted on the upper end of the leg part 3 of the tripod 1. The vertical level 5 has a hook member 5a that engages with the corresponding hook slot 8a formed in the shaft 8. Thus the vertical level 5 is firmly fixed to the head fixing central shaft 8 by means of the hook member 5a engaging the hook slot 8a.

In operation, when setting the tripod 1 by spreading the leg part 3, the vertical level 5 mounted on the shaft 8 is observed in order to precisely position the tripod in vertical position, and then the horizontal level 4 is observed in order to precisely position the head 2 in horizontal position by adjusting the left/right or up/down position of the head by using the adjustment handles 9, 9'.

In addition, the slightly bowed observance window 4a of the level has a plurality of concentric indication lines 4b, whereby any positional changes or inclination of the tripod during image capturing is precisely observed so as to easily correct the error.

As stated above, the tripod according to the present invention has the horizontal and vertical levels for showing the precise position so as to facilitate the correction of any positional errors, thus resolving the difficulties of precisely setting the tripod.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A tripod for a camcorder, comprising:
   a) a head part with an adjustment handle for holding said camcorder and a housing mount portion formed in one side of said head part;
   b) a horizontal sensing means mounted on one side of said head part, said horizontal sensing means including upper and lower housings mounted in said mount portion, said upper and lower housings each having an opening, a level for sensing the horizontal position of the camcorder and mounted in said upper and lower housing openings;
   c) a leg part for supporting said head part; and
   d) a vertical sensing means mounted on a head fixing central shaft extended from a bottom of said head part for sensing the vertical position of said camcorder.

2. A tripod for a camcorder as claimed in claim 1, wherein said vertical sensing means comprises:
   a) a level with a hook member on one side thereof for sensing the vertical position and;
   b) at least a hook slot formed on said head fixing central shaft for holding said hook member.

3. A tripod for a camcorder as claimed in claim 1, wherein said level is a device for establishing a horizontal line or plane by means of a bubble in a liquid.

* * * * *